United States Patent
Wang et al.

(10) Patent No.: US 10,069,174 B2
(45) Date of Patent: Sep. 4, 2018

(54) BATTERY PACK INCLUDING UNIT CELLS, TEMPERATURE DETECTION DEVICE, AND PROTECTION CIRCUIT MODULE CONNECTED TO SUBSTRATE

(71) Applicant: SAMSUNG SDI CO., LTD., Yongin-si, Gyeonggi-do (KR)

(72) Inventors: Han-Jun Wang, Yongin-si (KR); Dae-Yon Moon, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 767 days.

(21) Appl. No.: 14/295,424

(22) Filed: Jun. 4, 2014

(65) Prior Publication Data

US 2015/0017503 A1 Jan. 15, 2015

(30) Foreign Application Priority Data

Jul. 9, 2013 (KR) ........................ 10-2013-0080325

(51) Int. Cl.
*H01M 2/20* (2006.01)
*H01M 10/42* (2006.01)
*H01M 10/613* (2014.01)
*H01M 10/6553* (2014.01)

(52) U.S. Cl.
CPC ......... *H01M 10/425* (2013.01); *H01M 2/204* (2013.01); *H01M 10/613* (2015.04); *H01M 10/6553* (2015.04); *H01M 2200/10* (2013.01); *H01M 2220/30* (2013.01)

(58) Field of Classification Search
CPC ........... H01M 10/425; H01M 10/6553; H01M 10/613; H01M 2/204
USPC ......................................... 429/120, 121, 158
See application file for complete search history.

(56) References Cited

U.S. PATENT DOCUMENTS

| 2004/0126655 | A1* | 7/2004 | Hisamitsu ............... H01M 2/26 |
|---|---|---|---|
| | | | 429/162 |
| 2008/0118820 | A1 | 5/2008 | Jang et al. |
| 2010/0104932 | A1* | 4/2010 | Heidenbauer ....... H01M 2/1077 |
| | | | 429/99 |
| 2011/0052941 | A1 | 3/2011 | Jang et al. |

(Continued)

FOREIGN PATENT DOCUMENTS

| KR | 10-2008-0045946 | | 5/2008 |
|---|---|---|---|
| KR | 20090026650 | A * | 3/2009 |

(Continued)

OTHER PUBLICATIONS

Won et al., Machine translation of KR 2009-0026650 A, Mar. 2009 (Year: 2009).*

(Continued)

*Primary Examiner* — Sean P Cullen
(74) *Attorney, Agent, or Firm* — Lee & Morse, P.C.

(57) ABSTRACT

A battery pack includes a plurality of unit cells, a substrate electrically connected to the unit cells, a temperature protection device on the substrate, and a protection circuit module electrically connected to the substrate. The temperature protection device includes at least one metal contact electrically connected to the substrate. The substrate includes at least one hole at a location corresponding to the at least one metal contact. A width of the substrate is substantially equal to or less than widths of surfaces of the unit cells overlapping the substrate.

21 Claims, 3 Drawing Sheets

(56) References Cited

U.S. PATENT DOCUMENTS

| | | | |
|---|---|---|---|
| 2011/0151730 A1* | 6/2011 | Kim | H01M 2/0404 |
| | | | 439/884 |
| 2011/0159323 A1* | 6/2011 | Kim | H01M 2/30 |
| | | | 429/7 |
| 2012/0052331 A1 | 3/2012 | Park | |
| 2012/0052332 A1 | 3/2012 | Ahn | |
| 2012/0121940 A1* | 5/2012 | Park | H01M 2/20 |
| | | | 429/7 |
| 2012/0121945 A1* | 5/2012 | Kim | H01M 2/0404 |
| | | | 429/7 |
| 2012/0214027 A1 | 8/2012 | Ahn | |
| 2015/0017505 A1* | 1/2015 | Won | H01M 2/204 |
| | | | 429/121 |

FOREIGN PATENT DOCUMENTS

| | | |
|---|---|---|
| KR | 10-2011-0024251 | 3/2011 |
| KR | 10-2012-0020044 A | 3/2012 |
| KR | 10-2012-0020907 | 3/2012 |
| KR | 10-2012-0051198 A | 5/2012 |
| KR | 10-2012-0095295 | 8/2012 |

OTHER PUBLICATIONS

Korean Office Action dated Aug. 29, 2014.
Korean Notice of Allowance dated Feb. 27, 2015.

* cited by examiner

BATTERY PACK INCLUDING UNIT CELLS, TEMPERATURE DETECTION DEVICE, AND PROTECTION CIRCUIT MODULE CONNECTED TO SUBSTRATE

CROSS-REFERENCE TO RELATED APPLICATION

Korean Patent Application No. 10-2013-0080325, filed on Jul. 9, 2013, and entitled, "Battery Pack," is incorporated by reference herein in its entirety.

BACKGROUND

1. Field

One or more embodiments described herein relate to a battery.

2. Description of the Related Art

Unlike a primary battery, a secondary battery is rechargeable and, therefore, is used in a variety of portable electronic devices. One type of secondary battery which has been proposed includes a material having a high reactivity, e.g., lithium. For this reason, lithium batteries have been widely used.

A secondary battery may have a single cell or multiple cells depending, for example, on output and capacity requirements. A small device (such as a mobile phone) may have relatively small output and capacity requirements and, therefore, may use a single secondary battery. Conversely, a notebook computer or small personal computer may have larger output and capacity requirements and, therefore, may use a battery pack equipped with multiple secondary batteries that are connected in parallel or series.

Batteries must evolve in order to meet the requirements of their host devices. These requirements often include enhanced stability and miniaturization.

SUMMARY

In accordance with one or more embodiments, a battery pack includes a plurality of unit cells; a substrate electrically connected to the unit cells; a temperature protection device on the substrate; and a protection circuit module electrically connected to the substrate, wherein the temperature protection device includes at least one metal contact electrically connected to the substrate and wherein the substrate includes at least one hole at a location corresponding to the at least one metal contact.

A diameter of the at least one hole may be less than substantially 40% of a width of the substrate. The substrate may include a plurality of holes arranged in a length direction of the substrate. The may include one or more heat radiation holes located adjacent the temperature protection device.

The battery pack may further include a heat absorption plate between the substrate and temperature protection device. The battery pack may further include a plurality of taps electrically connecting the unit cells to the substrate, wherein a first side of each tap may be connected to the substrate and a second side of each tap may be connected to one of the unit cells and wherein each tap is bent to connect the first and second sides. Each tap may include a first notch corresponding to a bending position of the tap.

The battery pack may include a plurality of leads electrically connected to the substrate to the protection circuit module, wherein widths of the substrate at locations where the leads are attached may be less than a width at one or more other locations of the substrate.

The temperature protection device may be on a first surface of the substrate, the first surface of the substrate may face first surfaces of the unit cells, and the protection circuit module may be disposed adjacent to second surfaces of the unit cells. The substrate may be a printed circuit board. Also, the substrate may include a plurality of metal layers, each including a circuit pattern; and a plurality of insulating layers between respective pairs of the metal layers.

In accordance with another embodiment, a battery pack includes a plurality of unit cells; a substrate electrically connected to the unit cells; at least one temperature protection device on the substrate; a plurality of taps electrically connecting the unit cells to the substrate; and a protection circuit module electrically connected to the substrate, wherein each tap includes a first side connected to a first surface of the substrate and a second side connected to a first surface of one of the unit cells, wherein each tap is bent to allow the first surface of the substrate to face the first surfaces of the unit cells, wherein the at least one temperature protection device includes a metal contact connected to the first side of at least one of the taps, and wherein the substrate includes at least one hole at a location corresponding to the metal contact.

A diameter of the at least one hole may be less than 40% of a width of the substrate. The substrate may include a plurality of holes arranged in a length direction of the substrate.

The battery pack may include a lead connecting the substrate to the protection circuit module, wherein the lead may have a first side connected to the protection circuit module and a second side connected to the first surface of the substrate, and the lead may be bent to allow the protection circuit module to be disposed adjacent to a second surface of at least one of the unit cells.

The substrate may include a width of a first section of the substrate may be less than a width of a second section of the substrate, and the lead may be connected to the first section of the substrate. Each tap may include a bending position including a first notch, and the lead may include a bending position including a second notch.

The battery pack may include a heat absorption plate between the substrate and the at least one temperature protection device. Also, the substrate may include a heat radiation hole corresponding to the at least one temperature protection device.

The first surface of each unit cell may be an upper surface of the unit cell, each unit cell may include an anode and a cathode on the upper surface, and each unit cell may include a second surface that is a front surface or a rear surface of the unit cell.

In accordance with another embodiment, a battery pack includes a substrate; a first battery cell; a second battery cell; and a protection circuit on the substrate; first and second tabs between the substrate and respective ones of the first and second battery cells, wherein each of the first and second tabs is bent at a predetermined angle to electrically connect at least one metal layer within the substrate to a respective one of the first or second battery cells, and wherein a width of the substrate is substantially equal to or less than widths of surfaces of the first and second battery cells overlapping the substrate.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
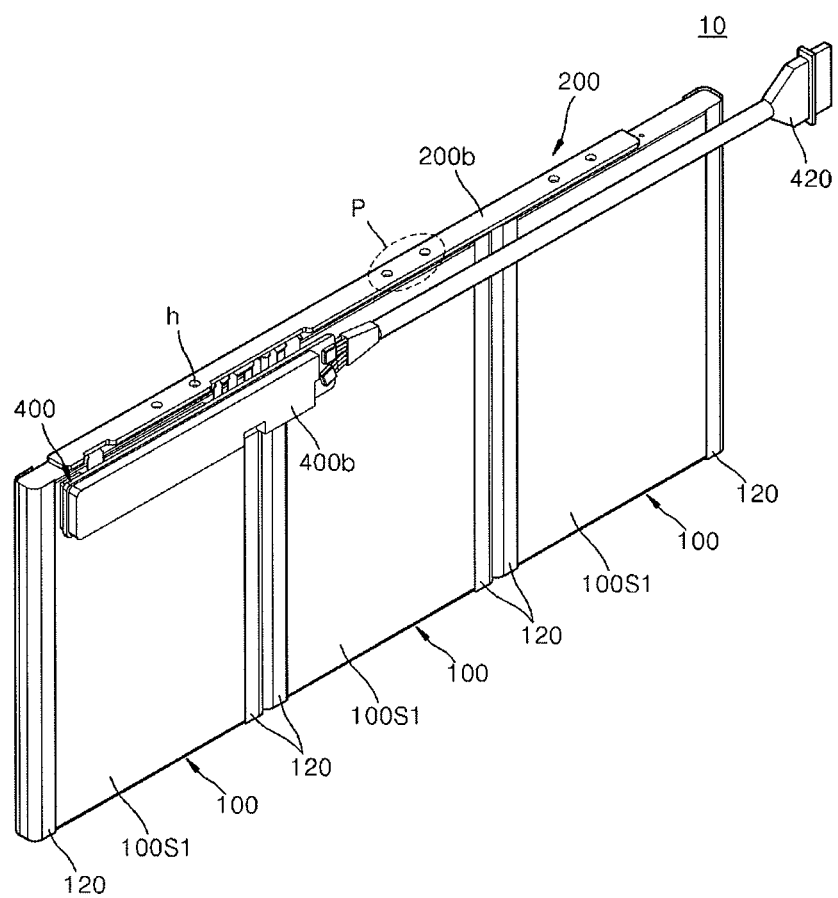
FIG. 1 illustrates an embodiment of a battery pack.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
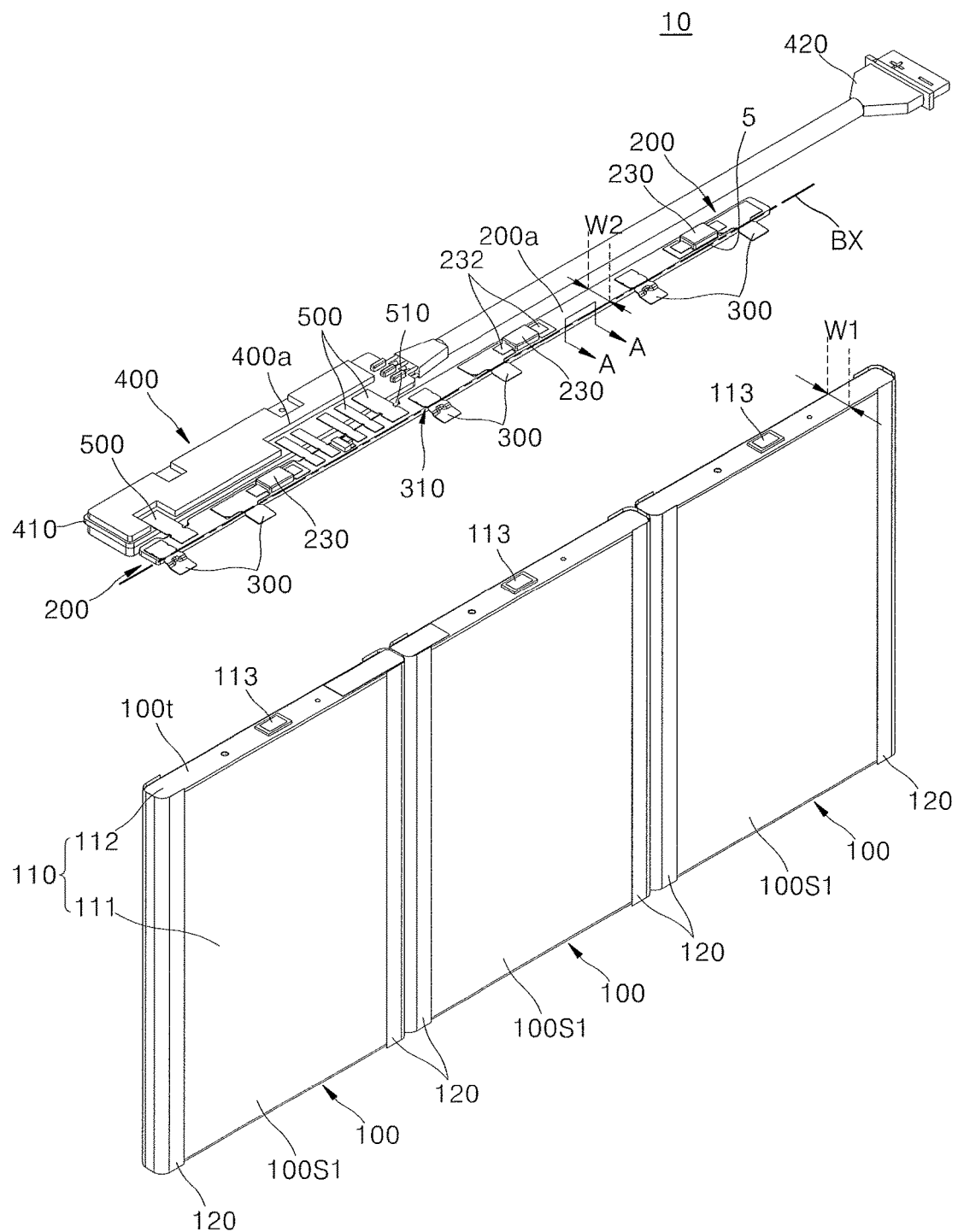
FIG. 2 illustrates a connection substrate and a protection circuit module in FIG. 1.

FIGS. 1 and 2 illustrate an embodiment of a battery pack 10 which includes a plurality of unit cells 100, a connection substrate 200 electrically connecting the unit cells 100, and a protection circuit module 400 electrically connected to connection substrate 200.

The unit cells 100 are rechargeable secondary batteries, for example, lithium-ion batteries. Each unit cell 100 may include a can 110 that accommodates an electrode assembly and an electrolyte. The electrode assembly may be, for example, a jelly roll type made by a wound an anode plate and a cathode plate. A separator may be interposed between the anode and cathode plates.

The electrode assembly may be accommodated in the can 110. The can 110 may include a main body 111 and a cap plate 112. The main body 111 may have an upper surface which is opened. The cap plate 112 may close the open surface of the main body 111. After the electrode assembly is placed in the main body 111 through the opening, the opening is sealed by the cap plate 112. The cap plate 112 may be combined with the main body 111, for example, by welding or another method of attachment.

The electrolyte may be injected into the can 110 through an inlet of the cap plate 112. The electrolyte is injected after the cap plate 112 is welded on the main body 111. After the electrolyte is injected into the can 110, the inlet may be sealed by using a lid.

In order to obtain strength and stability that can withstand a fall, the can 110 may be formed of a predetermined material, which, for example, may be aluminum or an aluminum alloy. Moreover, the can 110 has a predetermined shape, e.g., a cuboid shape. The unit cells 100 may be angular unit cells 100, and may be disposed side-by-side and parallel to each other in a predetermined direction.

When the can 110 is formed of a metal material, respective sides of the unit cells 100 may be covered by insulators 120 (e.g., insulating tape) in order to prevent short circuits between the unit cells 100. Also, separators for aligning and insulating the unit cells 100 may be disposed between respective pairs of adjacent unit cells 100.

An anode and a cathode may be formed on an upper surface of each unit cell 100, e.g., on the cap plate 112. For example, the cathode plate of the electrode assembly may be electrically connected to an electrode terminal 113 formed on the cap plate 112 The anode plate of the electrode assembly may be electrically connected to the cap plate 112. Thus, the electrode terminal 113 may be a cathode of the unit cell 100 and the cap plate 112 may be an anode of the unit cell 100. In an alternative embodiment, the electrode terminal 113 may serve as an anode plate and the cap plate 112 may serve as a cathode plate.

The connection substrate 200 electrically connects the unit cells 100. The connection substrate 200 may be, for example, a printed circuit board (PCB) on which a circuit pattern is printed.

Figure 3:
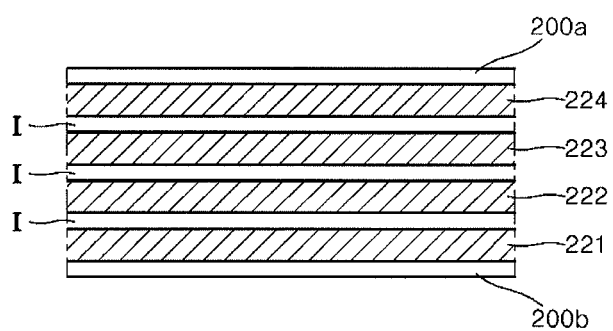
FIG. 3 illustrates a view taken along section line A-A in FIG. 2.

FIG. 3 illustrates a cross-sectional view taken along line A-A of FIG. 2, and shows an example configuration of the connection substrate 200. Referring to FIG. 3, the connection substrate 200 may include first through fourth metal layers 221, 222, 223, and 224 and insulating layers I interposed between the first through fourth metal layers 221, 222, 223, and 224. A first surface 200a and a second surface 200b of the connection substrate 200 may also be insulating layers. In FIG. 3, the connection substrate 200 is illustrated to include four metal layers. In an alternative embodiment, the connection substrate 200 may include a different number of metal layers.

In one embodiment, metal layers 221, 222, 223, and 224 may be formed to include a high conductivity metal, e.g., copper. Each of the metal layers may also include a circuit pattern. Also, metal layers 221, 222, 223, and 224 may be electrically connected to each other through via holes. With these metal layers, the unit cells 100 may connect to each other in parallel or series. In another embodiment, some of the unit cells 100 may be connected in parallel and others in series.

Through this construction, battery pack 10 does not include an additional metal plate for electrically connecting the unit cells 100. As a result, short circuits may be prevented from forming between the metal plates. Also, the unit cells 100 may be readily electrically connected to each other through welding between taps 300 and the connection substrate 200 and welding between the taps 300 and the anode/cathode of each of the unit cells 100.

In this way, a plurality of the taps 300 that connect the unit cells 100 to the connection substrate 200 may be attached to the first surface 200a of the connection substrate 200. Also, temperature protection devices 230 may be mounted on the first surface 200a of the connection substrate 200.

The taps 300 electrically connect the connection substrate 200 and the unit cells 100. More specifically, one side of each of the taps 300 may be connected to the connection substrate 200 and the other side may be connected to the cathode and/or anode of each of the unit cells 100. The taps 300 may be electrically connected to the connection substrate 200 and the unit cells 100, for example, by welding such as a laser welding or an ultrasonic welding.

The taps 300 that are electrically connected to the connection substrate 200 and the unit cells 100 may be bent at a predetermined angle, e.g., 180°. For example, the taps 300 may be bent along a bending axis BX (see, e.g., FIG. 2) so that the side of the tap 300 connected to the connection substrate 200 and the side of the tap 300 connected to the unit cells 100 are connected to each other. In this orientation, the connection substrate 200 may be disposed on first surfaces 100t of the unit cells 100.

The connection substrate 200 may be formed to have a width w2 which may be the same or substantially the same as a width w1 of the first surfaces 100t of the unit cells 100. Accordingly, the battery pack 10 may have a compact and space-efficient configuration, e.g., the available space for the battery pack in a host device may be increased through a reduction in the space occupied by the connection substrate 200.

Each of the tap 300 may include a first notch 310. The first notch 310 is a concave unit formed on both sides of the tap 300 along the width direction of the tap 300, and determines a bending position of the tap 300. Accordingly, since the tap 300 may be bent on a correct position by the first notch 310, the connection substrate 200 may not be misaligned with the first surfaces 100t of the unit cells 100.

Each temperature protection device 230 blocks current flow in the battery pack 10 when a respective one of the unit cells 100 overheats beyond a predetermined temperature. Each temperature protection device 230 may therefore prevent a respective one of the unit cells 100 from igniting or exploding. For example, each temperature protection device 230 may block current flow in the battery pack 10 when an overheating condition occurs due to excessive recharge or discharge of a respective one of the unit cells 100.

In one embodiment, the temperature protection device 230 is a reversible device, in which electrification and insulation are reversibly performed according to temperature. For example, each temperature protection device 230 may include a polymer positive temperature coefficient (polymer PTC), formed by distributing conductive particles such as metal particles or carbon particles in a crystalline polymer, a fuse, a current blocking device, a bi-metal, etc. Also, each temperature protection device 230 may include at least one metal piece (or contact) 232 for electrical connection to one or more other elements.

As previously described, the first surface 200a of the connection substrate 200 is disposed to face (or be adjacent to) the first surfaces 100t of the unit cells 100 due to the bending of the taps 300. Accordingly, temperature protection devices 230 mounted on the first surface 200a of the connection substrate 200 may sensitively react with temperature changes of respective ones of the unit cells 100, to thereby ensure operational stability of the battery pack 10.

Each temperature protection device 230 may be attached to a tap 300, for example, by welding. For example, a metal piece (or contact) 232 on one side of each temperature protection device 230 may be electrically connected to a tap 300, that is connected to an electrode terminal 113 of the unit cell 100, by welding. In on embodiment, another other metal piece (or contact) 232 may be electrically connected with another tap 300 that forms a current path with the protection circuit module 400.

The connection substrate 200 may include holes h at locations that correspond to respective ones of the metal pieces 232. Heat generated from each temperature protection device 230 may be dissipated through one or more holes h. Also, welding rods for welding the metal pieces 232 of the temperature protection device 230 to taps 300 may be inserted into the holes h.

Figure 4:
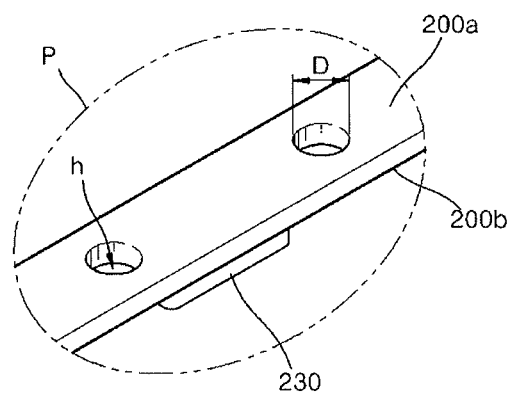
FIG. 4 illustrates an enlarged view of portion P in FIG. 1.

FIG. 4 illustrates an enlarged view of portion P of FIG. 1. Referring to FIG. 4, each hole h may have a circular shape and may be formed through the connection substrate 200. A diameter D of each hole h may be, for example, less than 40% of a width w2 of the connection substrate 200. In other embodiments, the holes may have different shapes and/or different predetermined diameters.

As previously described, the connection substrate 200 includes first through fourth metal layers 221, 222, 223, and 224, each of which may have a circuit pattern. When the holes h that pass through the connection substrate 200 are formed in the connection substrate 200, areas for forming the metal layers 221, 222, 223, and 224 are reduced by an amount proportional to or commensurate with the areas of the holes h. Accordingly, an area for printing the circuit pattern may be reduced. If the diameter D of the holes h is greater than 40% of the width w2 of the connection substrate 200, a width of the circuit patterns in the metal layers 221, 222, 223, and 224 is reduced. As a result, the resistance of the circuit patterns may be increased.

As previously described, welding rods for welding the temperature protection devices 230 to taps may be inserted into holes h. During operation, the welding rods may reach a high temperature. Accordingly, if the welding rod contact inner surfaces of the holes h, the connection substrate 200 may be damaged at corresponding locations. To reduce damage, in one embodiment, the diameter D of the holes h may be greater than the diameter of the welding rods to prevent contact between the holes and rods.

However, heat generated during welding may be dissipated through the holes h. Therefore, in consideration of this heat radiation effect, the diameter D of the holes h may be less than 40% of the width w2 of the connection substrate 200.

In one embodiment, the holes h may correspond to locations of the metal piece 232 and the taps 300 welded to the metal pieces 232. When the holes h are formed at these locations, the heat radiation effect (caused by heat generated from the temperature protection devices 230) may increase. To address this, the plurality of the holes h may be arranged in a length direction of the connection substrate 200, in consideration of the resistance of the connection substrate 200.

Additionally, a heat absorption plate 5 may be disposed between the connection substrate 200 and one or more of the temperature protection devices 230. The heat absorption plate 5 may prevent the temperature protection device(s) 230 from being damaged by heat.

Also, a plurality of heat radiation holes for readily diffusing heat generated from the temperature protection devices 230 may be formed in predetermined locations of the connection substrate 200, for example, at locations where the temperature protection devices 230 are located.

The protection circuit module 400 may be electrically connected to the unit cells 100 via the connection substrate 200, to protect the unit cells 100 from overheating or from exploding as a result of an overcharge, over discharge, or overcurrent condition. The protection circuit module 400 may include a substrate 410 and a protection device mounted on a side or in the substrate 410. The protection device may optionally be formed as a safety device that may include a passive device, such as a resistance and condenser. Additionally, or alternatively, the safety device may include an active device such as a field transistor or one or more integrated circuits.

A connector 420 for supplying power to an external electronic device may be included on a side of the protection circuit module 400.

The protection circuit module 400 may be electrically connected to the connection substrate 200 via leads 500 on a surface 400a of substrate 410, which is opposite to surface 400b of the protection circuit module 400. For example, one side of each of the leads 500 may be connected to the protection circuit module 400. The other side of each of the leads 500 may be connected to the connection substrate 200. The leads 500 may be electrically connected to the connection substrate 200 and the protection circuit module 400, for example, by welding.

The leads 500 that are electrically connected to the connection substrate 200 and the protection circuit module 400 may be bent at a predetermined angle, e.g., 90°. Accordingly, when the connection substrate 200 is disposed on the first surfaces 100t of the unit cells 100 due to the bending of the leads 500, the protection circuit module 400 may be adjacently disposed to second surfaces 100S1 of the unit cells 100 due to the bending of the leads 500. The second surfaces 100S1 of the unit cells 100 may be front surfaces or rear surfaces of the unit cells 100.

Each lead 500 may include a second notch 510 that allows for easy bending of the lead 500 and that determines a bending position of the lead 500. The second notches 510 may be, for example, grooves on one or both sides of the leads 500 in a width direction. A bending region of the lead 500 on which the second notch 510 is formed may therefore have a width less than a width of the non-bending region of the lead 500.

In one embodiment, as illustrated in FIG. 1, the connection substrate 200 may include one or more area reducing units, in which the width of the connection substrate 200 is reduced at a region where the lead 500 is attached. As described above, the protection circuit module 400 may be disposed adjacently to the second surfaces 100S1 of the unit cells 100 by bending the leads 500 by a predetermined angle, e.g., 90°. However, because the width of the connection substrate 200 is reduced at regions where the leads 500 are attached, second notch 510 of the leads 500 may be formed at positions close to the unit cells 100, and the bending state of the leads 500 may be readily confirmed. Accordingly, a gap between the protection circuit module 400 and the second surfaces 100S1 of the unit cells 100 may be reduced, and thus a compact battery pack 10 may be manufactured.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
   at least one tap;
   a plurality of unit cells;
   a substrate electrically connected to the unit cells;
   at least one temperature protection device on the substrate; and
   a protection circuit electrically connected to the substrate,
   wherein the at least one tap bends so that a surface of the substrate including the at least one temperature protection device faces upper surfaces of the unit cells,
   a bending axis of the at least one tap being parallel to a direction in which the unit cells are arranged,
   wherein the at least one temperature protection device includes at least one metal contact electrically connected to the substrate and welded to the at least one tap, and
   wherein the substrate includes at least one hole at a location corresponding to the at least one metal contact, the at least one hole overlapping the at least one metal contact and the at least one tap.

2. The battery pack as claimed in claim 1, wherein a diameter of the at least one hole is less than substantially 40% of a width of the substrate.

3. The battery pack as claimed in claim 1, wherein the at least one hole includes a plurality of holes arranged in a length direction of the substrate.

4. The battery pack as claimed in claim 1, wherein the substrate includes one or more heat radiation holes corresponding to the at least one hole located adjacent the at least one temperature protection device.

5. The battery pack as claimed in claim 1, further comprising: a heat absorption plate between the substrate and the at least one temperature protection device.

6. The battery pack as claimed in claim 1, wherein:
   the at least one temperature protection device is on a first surface of the substrate,
   the first surface of the substrate faces first surfaces of the unit cells, and
   the protection circuit is disposed adjacent to second surfaces of the unit cells.

7. The battery pack as claimed in claim 1, wherein the substrate is a printed circuit board.

8. The battery pack as claimed in claim 7, wherein the substrate includes:
   a plurality of metal layers, each including a circuit pattern; and
   a plurality of insulating layers between respective pairs of the metal layers.

9. The battery pack as claimed in claim 1, wherein:
   the at least one tap includes a plurality of taps,
   the at least one temperature protection device includes a plurality of temperature protection devices, each of the temperature protection devices having at least one metal contact,
   the taps electrically connect the unit cells to the at least one metal contact of respective ones of the temperature protection devices on the substrate,
   a first side of each of the taps is connected to a respective one of the at least one metal contact and a second side of each of the taps is connected to one of the unit cells, and
   each of the taps is bent to connect the first and second sides.

10. The battery pack as claimed in claim 9, wherein each of the taps includes a first notch corresponding to a bending position of the tap.

11. The battery pack as claimed in claim 9, further comprising:
   a plurality of leads to electrically connect the substrate to the protection circuit,
   wherein widths of the substrate at locations where the leads are attached are less than a width at one or more other locations of the substrate.

12. A battery pack, comprising:
   a plurality of unit cells;
   a substrate electrically connected to the unit cells;
   at least one temperature protection device on the substrate;

a plurality of taps electrically connecting the unit cells to the substrate; and a protection circuit electrically connected to the substrate, wherein each tap includes a first side connected to a first surface of the substrate and a second side connected to a first surface of one of the unit cells, wherein each tap is bent to allow the first surface of the substrate to face the first surfaces of the unit cells, a bending axis of the at least one tap being parallel to a direction in which the unit cells are arranged, wherein the at least one temperature protection device includes a metal contact that contact the first side of at least one of the taps, wherein the substrate includes at least one hole at a location corresponding to the metal contact, the at least one hole overlapping the metal contact and the at least one of the taps.

13. The battery pack as claimed in claim 12, wherein a diameter of the at least one hole is less than 40% of a width of the substrate.

14. The battery pack as claimed in claim 12, wherein the at least one hole includes a plurality of holes arranged in a length direction of the substrate.

15. The battery pack as claimed in claim 12, wherein the substrate includes a heat radiation hole corresponding to the at least one temperature protection device and the at least one hole.

16. The battery pack as claimed in claim 12, further comprising:
a heat absorption plate between the substrate and the at least one temperature protection device.

17. The battery pack as claimed in claim 12, wherein:
the first surface of each unit cell is an upper surface of the unit cell,
each unit cell includes an anode and a cathode on the upper surface, and
each unit cell includes a second surface that is a front surface or a rear surface of the unit cell.

18. The battery pack as claimed in claim 12, further comprising:
a lead connecting the substrate to the protection circuit,
wherein the lead has a first side connected to the protection circuit and a second side connected to the first surface of the substrate, and
the lead is bent to allow the protection circuit to be disposed adjacent to a second surface of at least one of the unit cells.

19. The battery pack as claimed in claim 18, wherein the substrate includes:
a width of a first section of the substrate is less than a width of a second section of the substrate, and
the lead is connected to the first section of the substrate.

20. The battery pack as claimed in claim 19, wherein:
each tap includes bending position including a first notch, and
the lead includes a bending position including a second notch.

21. A battery pack, comprising:
a substrate;
a first unit cell;
a second unit cell; and
a protection circuit on the substrate; and
first and second taps between the substrate and respective ones of the first and second unit cells,
wherein each of the first and second taps is bent at a predetermined angle to electrically connect different metal layers within the substrate to the first and second unit cells,
a bending axis of each of the first and second taps being parallel to a direction in which the first and second unit cells are arranged,
the different metal layers vertically spaced and overlapping one another, and
wherein a width of the substrate is substantially equal to or less than width of surfaces of the first and second unit cells overlapping the substrate.

* * * * *